United States Patent
Betker et al.

(10) Patent No.: US 6,923,578 B2
(45) Date of Patent: Aug. 2, 2005

(54) OPTICAL TERMINUS KEYING

(75) Inventors: Jay Brian Betker, Yorba Linda, CA (US); Terry Lee Adams, Huntington Beach, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 155 days.

(21) Appl. No.: 10/372,429

(22) Filed: Feb. 21, 2003

(65) Prior Publication Data

US 2004/0165833 A1 Aug. 26, 2004

(51) Int. Cl.$^7$ .................................................. G02B 6/38
(52) U.S. Cl. ............................................. 385/55; 385/77
(58) Field of Search ............................. 385/55, 58–60, 385/70–72, 76–78

(56) References Cited

U.S. PATENT DOCUMENTS

| | | | |
|---|---|---|---|
| 4,190,316 A | 2/1980 | Malsby et al. | 350/96.18 |
| 4,607,911 A | 8/1986 | Rhodes | 350/96.2 |
| 4,953,941 A * | 9/1990 | Takahashi | 385/72 |
| 5,011,246 A | 4/1991 | Corradetti et al. | 350/96.2 |
| 5,093,878 A | 3/1992 | Haley et al. | 385/92 |
| 5,212,753 A * | 5/1993 | Maranto | 385/80 |
| 5,727,101 A | 3/1998 | Giebel et al. | 385/59 |
| 6,004,045 A | 12/1999 | Snackers et al. | 385/92 |
| 6,019,519 A | 2/2000 | Grinderslev et al. | 385/56 |
| 6,102,581 A | 8/2000 | Deveau et al. | 385/56 |
| RE37,079 E | 3/2001 | Stephenson et al. | 385/78 |
| RE37,080 E | 3/2001 | Stephenson et al. | 385/78 |
| 6,238,101 B1 | 5/2001 | Chen et al. | 385/60 |
| 6,287,018 B1 | 9/2001 | Andrews et al. | 385/60 |
| 6,331,079 B1 | 12/2001 | Grois et al. | 385/53 |
| 6,347,889 B1 | 2/2002 | Cheng | 385/60 |
| 6,663,293 B2 * | 12/2003 | Lampert et al. | 385/78 |

* cited by examiner

Primary Examiner—Rodney Bovernick
Assistant Examiner—Mike Stahl
(74) Attorney, Agent, or Firm—Roger C. Turner

(57) ABSTRACT

An optical fiber connector in which a terminus assembly (20) can be keyed so it is always installed in a predetermined rotational position about the axis of a terminus-receiving passage (18) of a housing (12). When a terminus rotational position is found that results in minimal insertion loss, a noncircular index sleeve (40) is placed around the terminus body (24) and fixed thereto. An indexing plate (70) is installed in the connector housing, with indexing passage portions (72) that receive the index sleeve at only a single rotational position of the indexing sleeve about the passage axis.

6 Claims, 2 Drawing Sheets

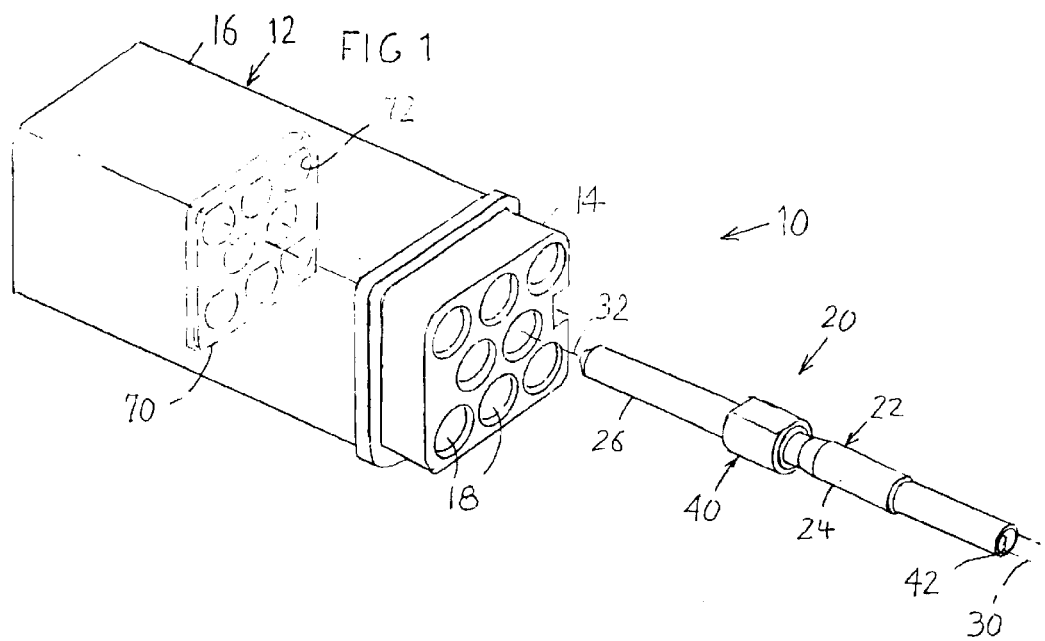
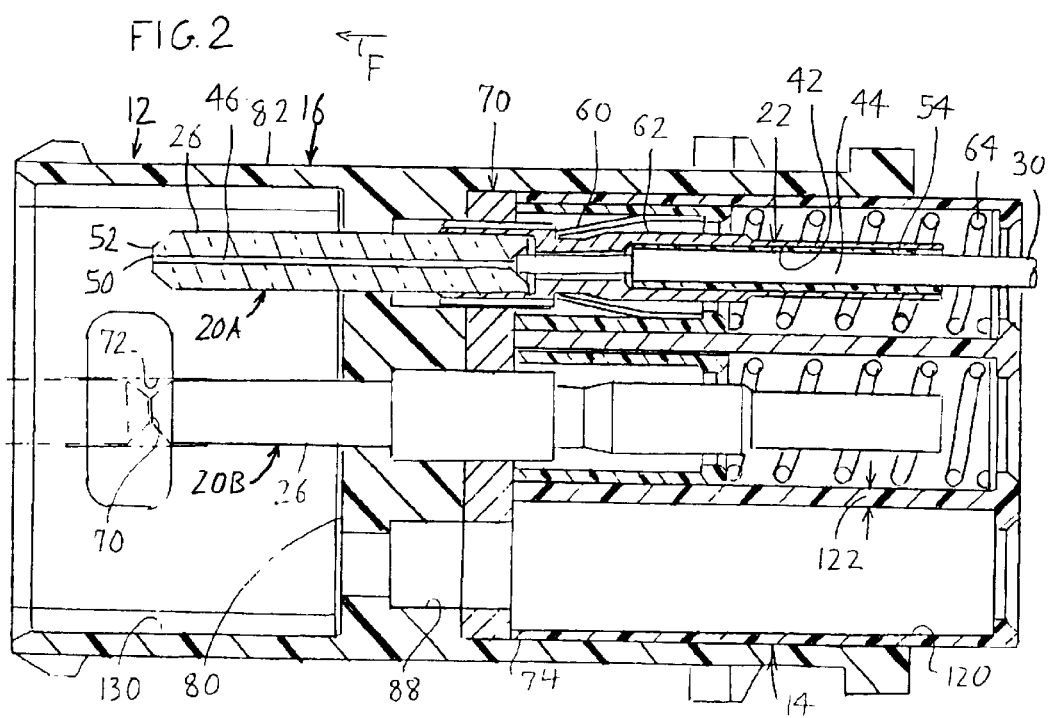

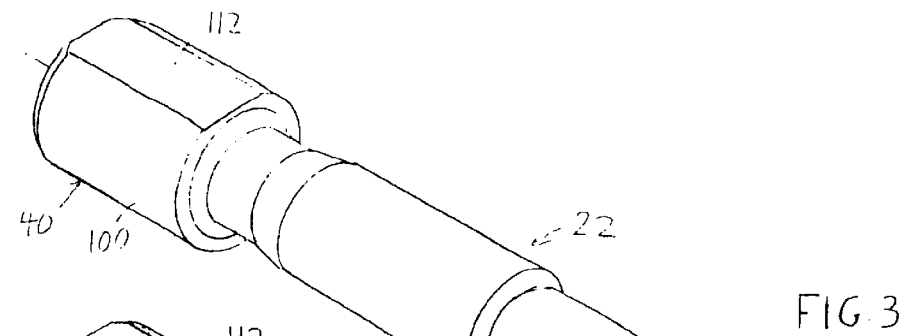
FIG. 3
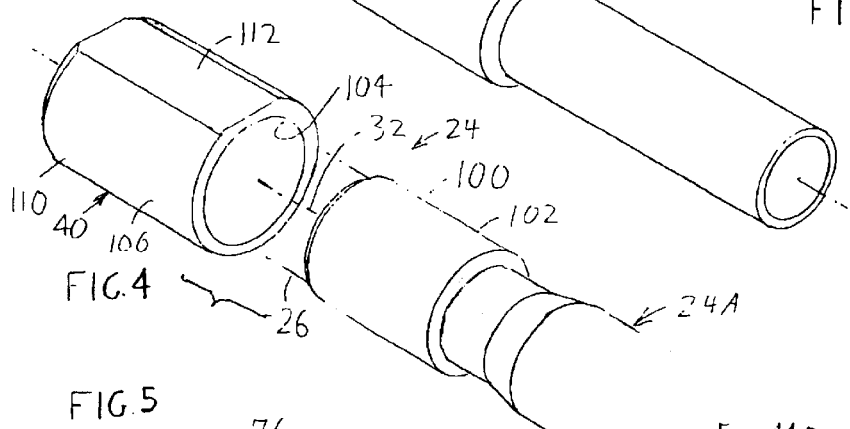
FIG. 4
FIG. 5
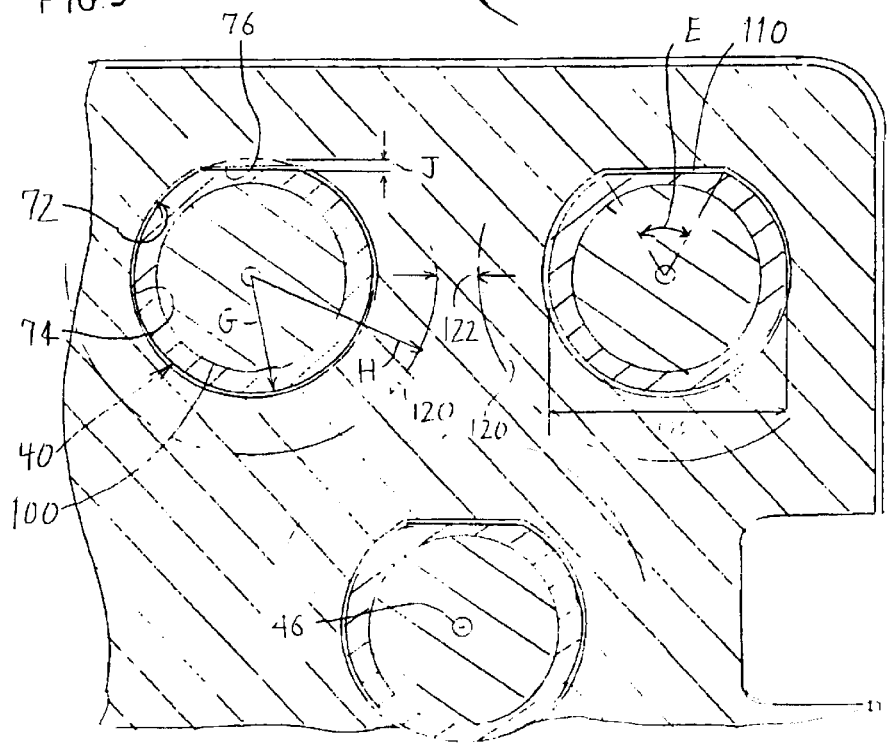

6,923,578 B2

OPTICAL TERMINUS KEYING

BACKGROUND OF THE INVENTION

Optical fibers are commonly coupled to one another by attaching a terminus to the stripped end of each optic fiber cable. The tip of each optic fiber is lapped flush with the tip of a ferrule of the terminus. The tips of the ferrules and fibers are aligned within a precision alignment sleeve so the tips of the two fibers abut one another. In practice, the tips of the fibers are slightly eccentric to the axis of the ferrules (e.g. by perhaps 3 microns for a single mode fiber of 9 microns diameter), and the tips lie in planes that are not exactly perpendicular to the ferrule axes. This results in an insertion loss, which is the loss of light intensity due to the light having to pass between the tips of two imperfectly abutting fibers.

The insertion loss can be reduced by rotating one terminus and its corresponding optical fiber, to different positions about the terminus axis and measuring the insertion loss at each position. For nonpolarized systems, a terminus position within about 30° of the ideal terminus position produces approximately the lowest insertion loss. For systems where the light is polarized, a rotational position angled even a few degrees from the position of minimum insertion loss, can result in a significantly greater insertion loss than at the best position. Since a terminus occasionally has to be removed from its housing, as to clean its tip, it is desirable that any means for fixing the orientation of the terminus enable removal of the terminus and its reinstallation at the optimum position.

Optical fiber connectors that connect a plurality of pairs of optical fibers, are generally constructed with their terminus-receiving passages closely spaced, and often at a standard spacing so the overall size of the connector is a minimum. It is desirable that any means for fixing the orientation of the terminus, enable the same spacing between passages as when no means is provided to fix the terminus orientation.

SUMMARY OF THE INVENTION

In accordance with one embodiment of the present invention, an optical fiber connector is provided, which includes a housing having a plurality of terminus-receiving passages and optical fiber terminus assemblies that fit into the passages, which minimizes insertion loss. The connector includes means for fixing the rotational orientation of each terminus assembly about the corresponding passage axis, in a construction that allows removal and reinstallation of a terminus assembly at the same rotational orientation, and with close spacing between the passages. An index sleeve with a noncircular periphery is provided, that can be installed on the terminus body at any relative rotational position. In addition, each terminus-receiving passage of the housing is provided with an indexing passage portion that is noncircular and that receives the index sleeve at only one rotational position of the index sleeve about the passage axis.

The housing can include an outer housing part in the form of a shell with a blocking wall extending across its inside to form front and rear cavities at opposite ends of the blocking wall. The inner housing part, which forms portions of the passages, is installed by sliding it forwardly into the rear cavity of the outer housing part. An indexing plate with a plurality of noncircular indexing passage portions, is trapped between the front of the inner plate and the blocking wall.

The novel features of the invention are set forth with particularity in the appended claims. The invention will be best understood from the following description when read in conjunction with the accompanying drawings.

BRIEF DESCRIPTION OF THE DRAWINGS

FIG. 1 is an exploded isometric view an optical fiber connector and an optical fiber terminus assembly of the present invention.

FIG. 2 is a sectional view of the connector of FIG. 1, with one passage containing a terminus assembly shown in section, another passage containing a terminus assembly shown in side elevation, and a third passage shown empty.

FIG. 3 is a rear isometric view of the terminus of the terminus assembly of FIG. 1.

FIG. 4 is a partially exploded rear isometric view of the terminus of FIG. 3.

FIG. 5 is a sectional view of FIG. 2.

DESCRIPTION OF THE PREFERRED EMBODIMENTS

FIG. 1 illustrates an optical fiber connector 10 of the present invention, which includes a housing 12 with inner and outer housing parts 14, 16. The housing forms terminus-receiving passages 18 with portions in each housing part. An optical fiber terminus assembly 20 can be installed in any one of the passages. The assembly 20 includes a terminus 22 with a body 24 and a ferrule 26, and a stripped front end of an optic fiber cable indicated in phantom lines at 30. The connector also includes an index sleeve 40 which is mounted on a front portion of the terminus body 24, and which determines the rotational position of the terminus assembly 20 about its axis 32.

FIG. 2 shows two terminus assemblies 20A, 20B, with assembly 20A being shown in section and assembly 20B being shown in side elevation. The terminus 22 of the assembly 20A has a bore 42 that receives the stripped front portion 44 of the cable 30. The entire cable includes an outer jacket and a strength member within the outer jacket, neither of which is shown in the drawings. The strength members of several cables are commonly fixed together in a mount that is fixed to the housing, and the mount can withstand pulling forces applied to the rear portions of the cable. An optical fiber 46 of the cable extends through the ferrule, and its front tip 50 lies precisely flush with the front tip 52 of the ferrule. An epoxy 54 fixes other portions of the cable in the bore 42 of the terminus. A retainer clip 60 retains the terminus in the housing 12, although a tool in the form of a thin cylinder can be inserted forwardly F around the terminus rear portion 62 to expand the clip and pull out the terminus from the connector passage 14. A spring 64 biases the terminus forwardly. As shown for the assembly 20B, this allows the tip of the ferrule 26 to engage the tip 70 of a mating ferrule, when both of them are closely held within an alignment sleeve passage 72, to transmit light from one terminus to the other.

When the tips of the two ferrules and their optical fiber tips abut one another, there is an insertion loss, which represents the decrease in light amplitude as it passes from one tip to the other. One cause for insertion loss is that the tips of the two optical fibers are not precisely concentric. Another cause is that the tips of the fibers lie in planes (which may be slightly curved) that are not precisely parallel. There is high cost for reducing these factors. However, the insertion loss can be minimized by rotating one of the terminus assemblies to different positions until a position of minimum insertion loss is found, when the measured loss of light as it passes from one optic fiber cable to the other is a minimum. The present invention relates to apparatus for maintaining the position of minimum insertion loss.

The housing 12 shown in FIG. 1 includes an indexing plate 70 with indexing passage portions 72 that are aligned with the rest of the portions of the passages 18 in the housing. The index sleeve 40 of each optic fiber terminus assembly 20 slides into one of the indexing passage portions 72 when the terminus is fully installed in a passage. The purpose of the index sleeve 40 is to fix the rotational position of the terminus assembly about the axis 32, at the position that has been found to result in least insertion loss.

FIG. 2 shows that the indexing plate 70 is trapped between the front end 74 of the inner housing part 14 and a blocking wall 80 that extends across the inside of a shell portion 82 of the outer housing part 16. While the inner and outer housing parts are preferably formed of molded plastic, the indexing plate 70 is preferably formed of machined metal, for the purposes described hereafter.

FIGS. 3 and 4 show the construction of the terminus 22, showing how the index sleeve 40 is installed. FIG. 4 shows that the body 24 of the terminus includes a body front part 100 that has a circular periphery 102. A separate index sleeve 40 has a circular through bore 104 that closely receives the body front part 100. The index sleeve has an outer surface 106 that is noncircular. The outer surface 106 includes a cylindrical portion 110 of a partial circle in cross-section extending around most of the surface (at least 240°). The sleeve also has a flat spot 112 or line, that connects the partial circle ends and that subtends at an angle of less than 120°, and preferably no more than 90°, with the particular angle extending about 60° about the axis 32. FIG. 5 shows that each indexing passage portion 72 has a shape corresponding to that of the outside of the index sleeve 40, with a circular portion 74 and with a flat spot 76 subtending an angle E of 60°.

The terminus portion 24A (FIG. 4) without the index sleeve, but with the ferrule 26, in place, is tested to determine its rotational position of minimum loss when the tip of the ferrule abuts a mating terminus assembly having a predetermined offset. The index sleeve 40 is then installed on the body front portion 100 in a manner that prevents relative rotation (preferably within 5°) of the index sleeve with respect to the terminus portion 24A. Such fixing of the index sleeve 40 can be accomplished in a number of ways. One way is to form the bore 104 in the index sleeve so it receives the body front portion in a press fit. Adhesive can be used to fix the parts together. Other fixing approaches can be used, including a pin that extends radially through corresponding holes in the index sleeve and body front portion or a set screw. Once the index sleeve is fixed to the rest of the terminus, the terminus can be installed, removed and reinstalled, and at only a single rotational position of the terminus assembly about its axis.

FIG. 2 shows that rear passage portions 120 that are formed in the inner housing part, are closely spaced, with a small wall thickness 122 between adjacent passage portions which is less than half the passage diameter. As shown in FIG. 5, the index sleeve 40 adds only a small additional diameter to the body front portion 100. The radius G of the index sleeve adds a small amount to the diameter of the terminus portion that enters the blocking wall, but the diameter G is still less than the maximum radius H of the passage which is required to hold the spring and a clip-holding member. An index sleeve 40 can be constructed by precisely machining the circular bore 104 and machining a concentric circular periphery which includes the circular portion 110. The resulting sleeve is further processed by machining a precision flat spot 110. This results in a simple machining process that produces high precision. As mentioned above, when polarized light is to be transmitted between fibers, it is desirable that the rotational position of the fiber be precisely fixed.

The fact that the index sleeve 40 adds only a small additional diameter to the terminus, enables the same connector design to be used as previously, with the only modification being that the blocking wall 80 (FIG. 2) has larger bores 88 and that the housing parts be slightly modified to accommodate the thickness of the indexing plate 70. The front cavity 130 of the outer housing part can be of the same size and shape as in prior connectors, to receive the same alignment sleeve device used in connection with prior connectors.

In a connector of the above construction that applicant designed, the index sleeve had a diameter 2G of 1.765 mm and the flat spot 110 had a maximum thickness J of 0.033 mm and subtended 60°. The index sleeve bore was of 1.234 mm diameter while the body front portion 100 had an outside diameter of 1.249 mm, for an interference of 0.01 mm (0.4 thousandths) inch.

Thus, the invention provides an optical fiber connector wherein the terminus assembly is fixed in a single rotational position about its axis, and can be removed and reinstalled, with the reinstalled terminus assembly lying in the same single position which produces minimal insertion loss. This is accomplished by mounting an index sleeve with a non-circular periphery on a front portion of the terminus body, and by providing the housing with a terminus-receiving passage that has a corresponding noncircular indexing passage portion that closely receives the index sleeve and prevents it from rotating. The index sleeve can be fixed by press fitting, adhesive, or other means. The terminus-receiving passages are formed in an indexing plate that is trapped in a rear cavity of an outer housing part, between a blocking wall of the outer housing part and the front end of the inner housing part.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An optical fiber connector that includes a housing having a plurality of passages that each have an axis, and a plurality of optical fiber terminus assemblies that each includes a terminus lying in one of said passages and comprising a body and a ferrule, and an optical fiber cable with a front stripped portion extending through the terminus, wherein:

said housing includes outer and inner housing parts, said outer housing part comprising a shell with a blocking wall that separates the inside of the shell into front and rear cavities;

said inner housing part having at least a front portion that is forwardly slideable into said rear cavity, said inner housing part having a plurality of inner housing bores;

an indexing plate that lies trapped in said shell rear cavity between a front end of said inner housing part and said blocking wall, said indexing plate having a plurality of indexing bores each aligned with one of said inner housing bores to form at least part of one of said passages;

each of said indexing bores is noncircular and nonsymmetric about the corresponding passage axis;

said terminus bodies each includes a front portion that fits closely into a cylindrical hole; and including a plurality of index sleeves that each has a bore that closely receives one of said body front portions at any relative rotational position about said axis, and each of said index sleeves being fixed to one of said body front portions;

each of said index sleeves has a noncircular outside surface that fits closely into one of said indexing bores at only one rotational position of the index sleeve about the passage axis.

2. The connector described in claim 1, wherein:

said passages are separated in directions perpendicular to said passage axes, by distances that are less than half the maximum diameter of each passage;

said indexing bores and said index sleeve outside surfaces, each have a cross-section in the shape of a partial circle that subtends an angle of at least 240° and that has partial circle ends, and a line that extends between said partial circle ends, whereby the index sleeves and indexing bore add minimum width to each terminus body front portion.

3. An optical fiber connector that includes a housing having a plurality of terminus-receiving passages that each has a passage axis, and a plurality of optical fiber terminus assemblies that each includes a terminus comprising a body and a ferrule wherein the terminus has a bore, and each of said optical fiber terminus assemblies includes an optic fiber cable with a stripped portion extending forwardly through one of said terminus bores and with the cable trailing rearwardly behind the terminus, said termini each lying in one of said passages, a plurality of index sleeves each with a noncircular periphery, each index sleeve extends around one of said terminus bodies and is fixed to the terminus body, a plurality of said terminus-receiving passages each has an indexing passage portion with walls that closely receive one of said index sleeves, each index sleeve fits into one of said indexing passage portions in only one rotational position of the index sleeve around the passage axis, wherein:

said housing includes a one-piece outer housing part in the form of a shell with front and rear cavities and with a blocking wall extending across the inside of said shell and lying between said cavities, said blocking wall having a plurality of blocking wall bores each forming a portion of one of said terminus-receiving passages;

said housing includes an inner housing part with at least a front portion that is slideably insertable into said rear cavity, said inner housing part having a plurality of inner housing bores that are each aligned with one of said blocking wall bores;

an indexing plate that lies trapped in said shell hollow rear portion, between a front end of said inner housing part and said blocking wall;

said indexing plate has a plurality of index bores, each aligned with a pair of said blocking wall and inner housing bores, and each index bore forms one of said indexing passage portions.

4. An optical fiber connector that includes a housing having a plurality of terminus-receiving passages that each has a passage axis, and an optical fiber terminus assembly that includes a terminus comprising a body and a ferrule, said terminus having a bore, and said optical fiber terminus assembly including an optic fiber cable with a stripped portion extending forwardly through said terminus bore and with said cable trailing rearwardly behind said terminus, said terminus lying in a first of said passages, including:

an index sleeve having a cylindrical inside surface and having a primarily cylindrical outside surface that is cylindrical except for a flat spot, said cylindrical inside and outside surfaces lying concentric with each other;

said terminus body has a cylindrical outside surface that lies in said index sleeve cylindrical bore and is fixed therein;

a first of said terminus-receiving passages has an indexing passage portion with walls that form a cylindrical inside surface with a flat spot, and that closely receives said index sleeve;

said flat spot subtends an angle of less than 120° about said axis;

said index sleeve inside and outside cylindrical surfaces are of substantially constant diameters along the entire length of said index sleeve.

5. The connector described in claim 4 wherein:

said terminus body lies in a press fit in said index sleeve.

6. The connector described in claim 4 wherein:

said flat spot subtends no more than 90° about said axis.

* * * * *